United States Patent Office 3,767,642
Patented Oct. 23, 1973

3,767,642
PREPARATION OF SECONDARY
CELLULOSE ACETATE
Kenneth C. Campbell, James Martin Davis, and Robert E. Woods, Jr., Rock Hill, S.C., assignors to Celanese Corporation, New York, N.Y.
No Drawing. Filed June 30, 1971, Ser. No. 158,608
Int. Cl. C08b 3/06
U.S. Cl. 260—227                                        8 Claims

ABSTRACT OF THE DISCLOSURE

An improved process for the continuous production of secondary cellulose esters, the process involving the steps of fully neutralizing all strong acid catalysts in a fully esterified cellulose dope and then hydrolyzing the dope at temperatures in excess of about 125° C.

---

This invention relates to the preparation of cellulose secondary esters and more specifically, to a continuous cellulose secondary ester process involving the high temperature hydrolysis of a fully esterified cellulose ester.

Continuous processes for the preparation of cellulose esters are known, such processes being set forth in patents such as for instance, U.S. Pat. 2,854,446. In the patented process, cellulose esters are continuously prepared and as a terminal operation, hydrolyzed to a desired acetyl value in the presence of a strong acid catalyst by employing temperatures of from 48° to 58° C. for time periods of about eight hours. During hydrolysis, the acetyl value (AV) of flake is reduced from about 60 to 55. This corresponds to a change in percent cellulose reacted from 90.5 to 80.5. The hydrolysis reaction is as follows:

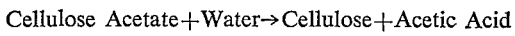

Cell—OAc+H₂O→Cell—OH+HOAc

Cellulose Acetate+Water→Cellulose+Acetic Acid

If both cellulose and water concentration changes are assumed to be negligible, hydrolysis may be expressed as a zero order kinetics reaction. The lengthy hydrolysis time periods however, in addition to having an adverse effect on the economics of the process, necessitate the use of high quality wood pulp, impair the clarity of the flake end product, cause poor plugging values and subsequent imperfections during spinning and increase spinning dope viscosity control.

It is therefore an object of this invention to provide a process for the continuous preparation of secondary cellulose acetate employing a high temperature hydrolysis step.

It is an additional object of this invention to provide a process for the preparation of secondary cellulose acetate from low cost cellulose pulp.

It is still another object of this invention to provide a secondary cellulose triacetate flake having improved clarity and plugging value.

These and other objects of the invention will become more apparent from the following detailed description.

In accordance with this invention, it has now been discovered that a high temperature hydrolysis step may be employed in a continuous process for the preparation of secondary cellulose acetate by the direct steam injection into fully esterified cellulose ester dope wherein strong acid catalysts have been fully neutralized the steam being allowed to raise the dope temperature to 125° to 170° C., the hydrolysis being conducted in narrow residence time distribution vessel, such as a multi-stage vessel, until the acetyl value reaches 55.0%, the residence time being from about 15 minutes to about two hours, and preferably from about 30 minutes to about one hour.

The acid catalyst of the acetylation reaction and excess acetic anhydride are neutralized by the addition of an aqueous solution of a neutralizing salt, such as carbonates, hydroxides, oxides, or acetates of calcium, magnesium, barium, iron aluminum and zinc, preferably magnesium acetate or zinc acetate. Preferably the neutralizing salt is magnesium acetate. The magnesium acetate solution is rapidly and uniformly blended with the acid dope to avoid localized concentration of water which might precipitate cellulose acetate, blending being accomplished in a high shear mixer. To obtain low combined sulfates, the excess neutralizing salt should be minimized however, neutralizing salt must be in a slight excess to insure that the sulfuric acid is completely neutralized. Since good mixing in the continuous process should minimize this problem, a 5% excess should be adequate to prevent incomplete neutralization during upsets. At this level, combined sulfates should be better than the batch process. Five percent by weight in excess of stoichiometric quantities is the most desirable level.

The dope temperature may then be raised to 170° C. by injecting steam into the dope through a high shear mixer or the first stage of a vigorously agitated hydrolysis reaction. A temperature of 140° C. to 150° C. is most preferred. Next, the cellulose triacetate is hydrolyzed to secondary cellulose acetate in a multi-stage column reactor with hydrolyzer dope pressures being maintained at or above 60 pounds per square inch gauge to avoid flashing acetic acid and water in the hydrolyzer. The process generally requires a 30–60 minute reaction time as compared to 150 minutes in the prior art two temperature processes.

The use of elevated hydrolysis temperatures permits the use of a lower cost wood pulp. Low cost pulps contain more hemicellulose and less alpha cellulose than standard acetylation grades, and flake produced from them has an above normal viscosity ratio, poor plugging value, and low clarity. Since higher temperature hydrolysis reduces viscosity ratio and also improves plugging value and clarity, it is possible to use wood pulp having an alpha cellulose content of from 92 to 93 weight percent while maintaining present yarn quality levels. Alternatively, better quality flake is obtained from high quality pulps.

As reaction temperature increases, process control becomes more critical because short-term upsets cause larger deviations in flake properties. As the temperature is increased, the ratio of viscosity loss to acetyl value loss will increase. Since more viscosity loss occurs during hydrolysis at higher temperatures, a higher IV leaving acetylation is necessary.

An increase in water concentration will increase both acetyl value drop and viscosity loss. Water concentration during hydrolysis or acetylation conditions may be adjusted to give desired molecular weight. Flake viscosity will usually be controlled by changing acetylation temperature, since an increase in acetylation temperature will increase plugging value and decrease flake viscosity. Therefore, viscosity loss during hydrolysis should be minimized so that acetylizer temperature and consequently, plugging value may be increased.

To minimize acid recovery cost, water concentration should be kept as low as possible. Only water in the steam and magnesium acetate solution will be added to the dope. Sufficient water must be present for hydrolysis to occur; therefore, there is a minimum acceptable water level. The water in the steam will provide a sufficient excess.

At 150° C., the selected hydrolysis reaction will require a 30-minute residence time. All reactors which have a residence time distribution equivalent to 20 or more stages are suitable for use with this invention. Because a narrower AV distribution is more desirable, the number of stages is determined by the maximum number that can be reasonably placed in one reactor (30 stages).

Close process control is important during hydrolysis. The previous discussion of residence time distribution shows the inherent variability of the hydrolyzer. In addition, flow and temperature upsets affect sample-to-sample variability. The effect of upsets is dependent upon both the magnitude and duration of the upset. Normally, dope flow variations in the pilot plant do not exceed about ±10% with a one-minute duration; however, the time to regain control may vary significantly.

After hydrolysis, the dope should be cooled to reduce the hydrolysis reaction rate so that variation in residence time in the precipitator feed tank will not upset acetyl value and viscosity control. The hydrolyzed dope should be cooled to from 100° C. to 60° C. by flash vaporizing across a control valve into an evacuated tank. During cooling, approximately one-third of the total acid will be vaporized as a 70% acid stream.

Several methods of dope cooling are possible, the methods being as follows:

(1) Flash cool at atmospheric pressure to 105° C., condense and subcool the vapor, and inject the cooled liquid in the dope to cool to final temperature.

(2) Flash cool under vacuum to final temperature.

Cooling by flash evaporation of the acid offers several economic advantages. Flashing will reduce dissolved air in the dope, probably resulting in higher flake density. Since the portion of the acid which is flashed during cooling will be a high concentration (about 70%), some acetic acid purification steps may be bypassed thereby reducing acid recovery cost.

Residence time distribution in the dope storage tank ahead of the precipitator is wide because of short circuiting. To avoid wide distribution in acetyl value and viscosity, the dope must be cooled so that properties change very little with changes in the tank level. A temperature between 60 and 85° C. is acceptable.

Turning to the chemistry of the process of this invention, it is known that presence of a catalyst, with an aliphatic acid anhydride, such as acetic anhydride, to form a cellulose ester according to the following simplified equation:

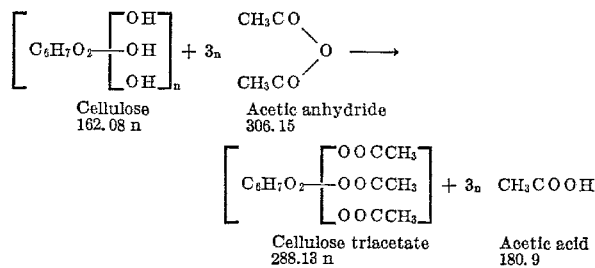

The fully acetylated cellulose acetate contains 44.8 percent combined acetyl or 62.5 percent, as combined acetic acid. The cellulose triacetate is then hydrolyzed to give a cellulose acetate which contains 39.42 percent combined acetyl or 55.0 percent, as combined acetic acid according to the following simplified equation.

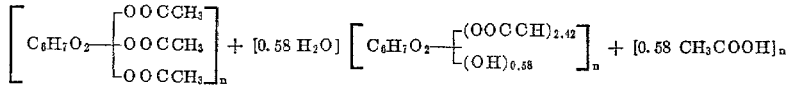

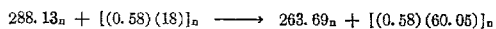

Specific continuous esterification processes which may be employed in conjunction with the high temperature hydrolysis of this invention are as follows:

(1) Cellulose is slurried in a lower fatty acid/water slurry containing from about 70 to 95 weight percent lower fatty acid and from about 5 to 30 weight percent water, wherein the lower fatty acid is a $C_1$ to $C_4$ monocarboxylic acid and mixtures thereof.

(2) Water is extracted from the cellulose slurry and the cellulose deliquored prior to esterification to prevent excessive anhydride consumption. The slurry is metered to an extractor and washed with from about 2 to 5 pounds of lower fatty acid per pound of cellulose. Residence time in the extractor ranges from about 2 to 10 minutes. Cellulose leaves the extractor and is deliquored to about 30 to 50 weight percent consistency and from about 2 to 5 weight percent water, based on the weight of the cellulose.

(3) The cellulose is preferably fluffed and a catalyst is blended therein. Any strong mineral acid such as sulfuric perchloric, nitric or hydrochloric is an effective catalyst. From about 5 to 10 weight percent based on the weight of the cellulose, of the catalyst is added to the cellulose.

(4) Pretreated cellulose containing the lower fatty acid and catalyst is mixed with a lower fatty acid/lower fatty acid anhydride mixture containing from about 10 to 30 weight percent excess anhydride. The cellulose mixture is esterified for from about 20 to 50 minutes with a gradually increasing temperature profile ranging from about 14 to 55° C.

(5) Esterified dope from the reactors is then thoroughly and rapidly blended with a slight excess of an aqueous solution of a neutralizing salt, such as carbonates, hydroxides, oxides, or acetates of calcium, magnesium, barium, iron, aluminum and zinc, preferably magnesium acetate or zinc acetate.

(6) The dope is then raised to a temperature of about 150° C. by injecting 200 pounds per square inch gauge steam into the dope through a multi-stage shear mixer, the neutralized esterified dope is then allowed to react to split off acetyl groups and combined anionin groups, e.g., sulfates, nitrates, perchlorates and chlorides. Dope is held in this vessel for 30–60 minutes.

(7) The dope is flash cooled to stop all reactions.

(8) Conventional secondary acetate flake finishing may then be employed, i.e., the flake is precipitated, washed, dried and stored for use.

Alternatively, a portion of the continuous cellulose triacetate process of U.S. Pat. 2,854,446 may be employed, the process employing the following steps:

(1) Defibering cellulose in 15 to 30 times its dry weight of water;

(2) Removing water from the defibered cellulose until it is impregnated by an amount of water of from 0.6 to 2.5 times the dry weight of the cellulose;

(3) Suspending the resulting water impregnated cellulose in 30 to 200 times its dry weight of aqueous lower carboxylic acid, said aqueous lower carboxylic acid being a solvent for the cellulose ester being manufactured and having a concentration of from 50 to 80%;

(4) Removing aqueous carboxylic acid from the resulting suspension until the cellulose is impregnated by an amount of aqueous carboxylic acid of from 1.5 to 4 times the dry weight of the cellulose;

(5) Displacing the remainder of the water from the resulting acid impregnated cellulose by means of at most 3 times the dry weight of the cellulose of the said lower carboxylic acid whereby cellulose impregnated with substantially anhydrous acid results together with aqueous lower carboxylic acid;

With the proviso that the suspension of the said water impregnated cellulose is effected with the entire amount of the aqueous lower carboxylic acid resulting from the said displacement operation and an amount of the aqueous lower carboxylic acid resulting from the said removal operation such that the total weight of aqueous lower carboxylic acid per unit of time used for the said suspension operation remains constant;

(6) Esterifying the said cellulose impregnated with substantially anhydrous lower carboxylic acid resulting from the said displacement operation with a mixture of a lower carboxylic acid anhydride, an esterification catalyst and a solvent for the cellulose ester being manufactured;

(7) The esterified dope is then blended with a slight excess of an aqueous solution of a neutralizing salt to neutralize all strong acid;

(8) The dope is then raised to a temperature of about 150° C. by injecting 200 pounds per square inch gauge steam into the dope through a multi-stage shear mixer and the neutralized esterified dope is allowed to react to split off acetyl groups and combined anionic groups, e.g., sulfates, nitrates, perchlorates and chlorides;

(9) The dope is flash cooled to stop all reactions;

(10) Conventional secondary acetate flake finishing may then be employed.

The following specific examples are given for purposes of illustration and should not be considered as limiting the spirit or scope of this invention.

EXAMPLE I

Wood pulp having an alpha-cellulose content of about 97 weight percent is slurried by hydropulping at about 2.5% by weight consistency in 80/20 weight percent acetic acid/water slurry for about 5 minutes and discharged into a slurry tank. Water is removed from the mixture by continuous countercurrent extraction of water from the slurry with glacial acetic acid in a 12-stage extractor. The slurry is countercurrently washed with about 2.9 pounds glacial acetic acid per pound of cellulose for about three minutes. A vacuum of about 8 inches of mercury is utilized to draw the liquid from the slurry forming a cellulose cake having about 15 weight percent consistency and about 9.3 weight percent water based on the weight of the cellulose. The cellulose cake is then deliquored to about 25 weight percent consistency and about 4 weight percent water based on the weight of the cellulose by subjecting it to the action of a squeeze roll.

The cellulose is fluffed; 7.1 weight percent, based on the weight of the cellulose of sulfuric acid is added to one pound of glacial acetic acid per pound of cellulose and mixed with the 25 percent consistency cellulose for about 2 to 3 seconds. This pretreated cellulose is then mixed with a mixture containing about 68 weight percent acetic anhydride and about 32 weight percent acetic acid which had been cooled to about 3° C. About 20 weight percent excess acetic anhydride over that required to fully acetylate the cellulose is used in the start-up. The cellulose is acetylated for approximately 30 minutes with a gradually increasing temperature profile from about 23° C. to 46° C., the two acetylyzers in series at approximately 20 theoretical stages insure substantially uniform residence time history. Acetylated dope from the reactors is rapidly blended with aqueous magnesium acetate (about 21 weight percent solution in water). The magnesium acetate is present in excess of stoichiometric quantities required to neutralize sulfuric acid.

The fully neutralized acetylated dope is hydrolyzed in a multi-stage agitated vessel by direct injection of steam into the dope so as to heat to a temperature of about 150° C. for about 30 minutes. The dope is then cooled to a temperature of less than 90° C. by flashing across a control valve into an evacuated tank under 250 mm. Hg absolute pressure.

The continuously reacted product is found to have an acetyl value of 55%, a plugging value of about 77 grams per square centimeter, a viscosity of about 105 centipoises, a total sulfates of about .008 weight percent and a combined sulfates of about .003 weight percent.

EXAMPLE II

Nitration grade woodpulp having an alpha-cellulose content of about 92 to 93 weight percent is reacted continuously according to the procedure set forth in Example I, the resultant flake having an acetyl value of about 55 percent, a plugging value of about 80 grams per square centimeter, a viscosity of 105 centipoises and total weight sulfates of about .008 weight percent and a combined sulfates of about .003 weight percent.

EXAMPLE III

Cellulose secondary acetate flake produced by Example I is solutioned in 95/5 weight percent acetone/water and extruded at both 750 meters per minute and 650 meters per minute. The process is then repeated except that secondary acetate flake produced by a batch process is employed. The flake of Example I is found to be operative at a dope concentration of 28.6 percent by weight cellulose secondary acetate flake. The batch produced flake is only found to be operative at a concentration of 26.8 percent by weight or less of cellulose secondary acetate flake. The pressure drop per minute which is a determination of dope blockage is found to have a value of 1.7 for 10 samples in the continuous flake line while a value of 2.6 is obtained for 14 samples in the batch flake line, the lower value indicating an improvement in runnability. The physical properties of the yarn produced from the flake of Example I is found to be equal or superior to the yarn produced from batch flake.

Having thus disclosed the invention, what is claimed is:

1. In a continuous process for the production of secondary cellulose acetate having an acetyl value of about 55% from fully esterified cellulose, the step of hydrolyzing said fully esterified cellulose having all strong acid catalysts fully neutralized at temperatures of from 125° C. to 170° C.

2. The process of claim 1 wherein said temperatures are from 140° C. to 150° C.

3. The process of claim 2 wherein said fully esterified cellulose is neutralized with an aqueous solution of magnesium acetate.

4. The process of claim 1 wherein subsequent to said hydrolyzing step, the hydrolyzed product is flash cooled to terminate the hydrolysis reaction.

5. In a continuous process for the preparation of secondary cellulose acetate by hydrolyzing cellulose triacetate to cellulose secondary acetate, the steps comprising blending acid catalyzed cellulose triacetate dope with an aqueous solution of a neutralizing salt to fully neutralize said dope; hydrolyzing and desulfating the dope at temperatures of from 125° C. to 170° C., and then flash cooling the hydrolyzed dope.

6. The process of claim 5 wherein said fully esterified cellulose is neutralized with an aqueous solution of magnesium acetate.

7. The process of claim 5 wherein hydrolyzing and desulfating of the dope is at temperatures of from 140° C. to 150° C.

8. The process of claim 5 wherein said cellulose has an alpha-cellulose content of from 92 to 93 weight percent.

References Cited

UNITED STATES PATENTS

| | | | |
|---|---|---|---|
| 3,485,816 | 12/1969 | Crane et al. | 106—198 |
| 3,455,901 | 7/1969 | Crane | 260—230 |
| 3,631,023 | 12/1971 | Horne et al. | 106—196 |
| 2,432,341 | 12/1947 | Seymour et al. | 260—227 |
| 2,603,638 | 7/1952 | Seymour et al. | 260—229 |
| 2,607,771 | 8/1952 | Groombridge et al. | 260—227 |
| 2,772,944 | 12/1958 | Allewelt | 260—229 |
| 2,854,446 | 9/1958 | Robin et al. | 260—229 |
| 2,966,485 | 12/1960 | Laughlin et al. | 260—227 |
| 3,041,329 | 6/1962 | Campbell et al. | 260—227 |

DONALD E. CZAJA, Primary Examiner

R. W. GRIFFIN, Assistant Examiner

U.S. Cl. X.R.

106—196; 198; 260—230 R